Nov. 29, 1960    K. E. HARRIS ET AL    2,962,713
SECONDARY RADAR SYSTEMS
Filed March 1, 1957

INVENTORS
KENNYTH E. HARRIS
DEREK A. LEVELL
BY
Ralph B. Stewart
ATTORNEY

United States Patent Office

2,962,713
Patented Nov. 29, 1960

2,962,713
SECONDARY RADAR SYSTEMS

Kennyth Ernest Harris, New Barnet, and Derek Alfred Levell, Edgware, England, assignors to A. C. Cossor Limited, London, England Filed Mar. 1, 1957, Ser. No. 643,273

8 Claims. (Cl. 343—17.1)

The present invention relates to secondary radar systems.

In a secondary radar system having an aerial system adapted to produce a single interrogating beam having directional characteristics difficulty is usually experienced in overcoming the effects due to aerial side lobes. The effects of such side lobes may be suppressed by the use of a control signal which is omni-directional and has an intensity intermediate that of the main and side lobes of the radiations from the interrogating aerial. A system of this kind is described in the specification of British Patent No. 734,588, and in U.S. Patent 2,824,301.

It may be desirable to overcome the disadvantageous effects of side lobes in a secondary system having no such suppression means or to provide additional suppression means in systems having suppression by a control signal and it is an object of the present invention to provide novel means for overcoming or substantially reducing the disadvantageous effects of side lobes in secondary radar systems.

According to the present invention there is provided a secondary radar system comprising a transmitter adapted to transmit two interlaced trains of interrogating pulses, the pulses of one train being of different intensity from those of the other train, and a receiver adapted to receive signals radiated from a co-operating transponder in response to the interrogating pulses, the receiver having gating means adapted to select from signals received in response to interrogating pulses of the greater intensity and pass to a signal responsive device only those from ranges exceeding a predetermined minimum. This minimum may be so chosen that signals received in response to interrogating pulses of the greater intensity in side lobes of the transmitter aerial are excluded by the gating means.

Preferably gating means are provided to operate upon signals received in response to both trains of interrogating pulses. Thus the gating means may be such as to pass only signals received from relatively short ranges in response to the interrogating pulses of lower intensity and only signals received from relatively long ranges in response to the interrogating pulses of higher intensity.

The interval, or minimum interval, between pulses of the composite train formed of the two component trains is preferably made greater than the maximum response time, that is the time between transmission of an interrogating pulse and the reception of a response from the greatest of said ranges.

More than two interlaced trains of pulses can of course be used and a correspondingly greater number of different ranges may be gated by the gating means. The trains are conveniently of single recurrent pulses, but recurrent groups of pulses may be used.

The transmitter power required to radiate a control signal, for example as described in the aforementioned patents, is greater than that required for the interrogating signal because the control signal has to be radiated approximately omni-directionally whereas the interrogating signal is in a narrow beam. However, because of the relatively low power needed for the interrogating pulses of lower intensity in the present invention, a control transmission can conveniently be used with these pulses.

The invention will be described by way of example with reference to the accompanying drawing in which.

Figure 1:
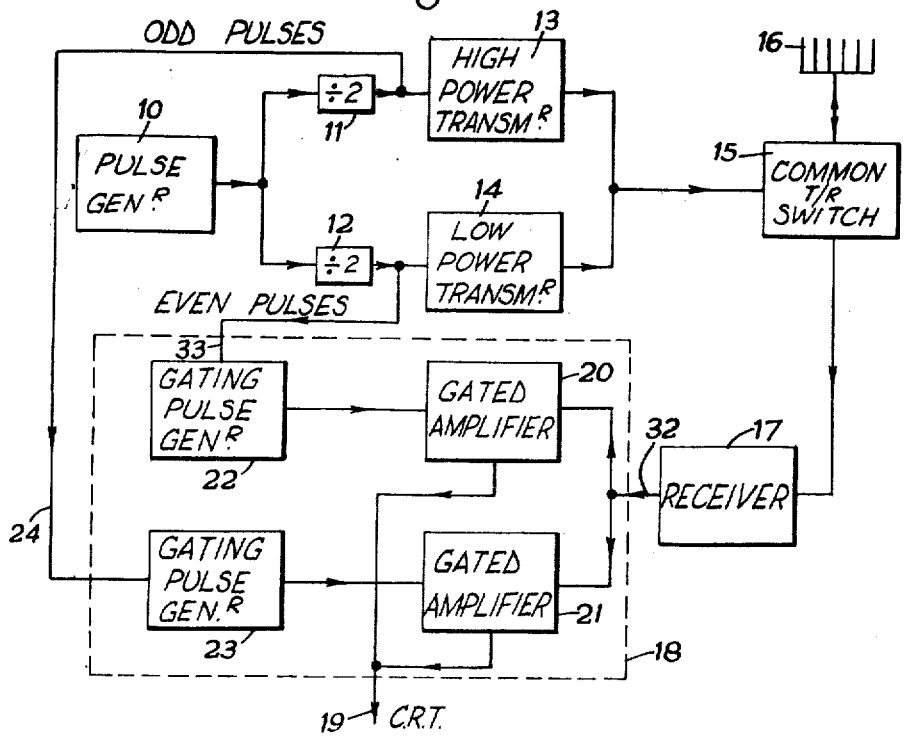
Fig. 1 is a block circuit diagram of one embodiment of the invention.

Referring to Fig. 1 a pulse generator 10 generates pulses at a recurrence frequency of 500 per second. These are applied to frequency dividers 11 and 12 by which odd numbered pulses are applied to a high power transmitter 13, and even numbered pulses are applied to a lower power transmitter 14, the power of the latter being, for example, 20 db below that of the former. The pulses in each of the trains applied to transmitters 13 and 14 by the dividers 11 and 12 are thus spaced at intervals of 4 milliseconds and there is an interval of 2 milliseconds between pulses in the composite train. The outputs of the transmitters 13 and 14 are fed through a common T/R switch 15 to an aerial 16 of the usual directional character employed for interrogating signals.

Signals received by the aerial 16 from a transponder in response to the interrogating pulses are applied through the switch 15 to a receiver 17 the output of which is applied through gating means included within a broken line rectangle 18 to a signal responsive device, such as a cathode ray tube, not shown, connected at 19.

The gating means 18 comprises two gated amplifiers 20 and 21, the former being gated by pulses from a gating pulse generator 22 and the latter being gated by pulses from a gating pulse generator 23. The generator 23 is triggered by the odd numbered pulses associated with the high power transmitter and is arranged to generate gating pulses extending over a response time corresponding to 10 to 100 miles in this example. The generator 22 is triggered by even pulses associated with the lower power transmitter and is arranged to generate gating pulses extending over a response time corresponding to 0 to 10 miles.

Figure 2:
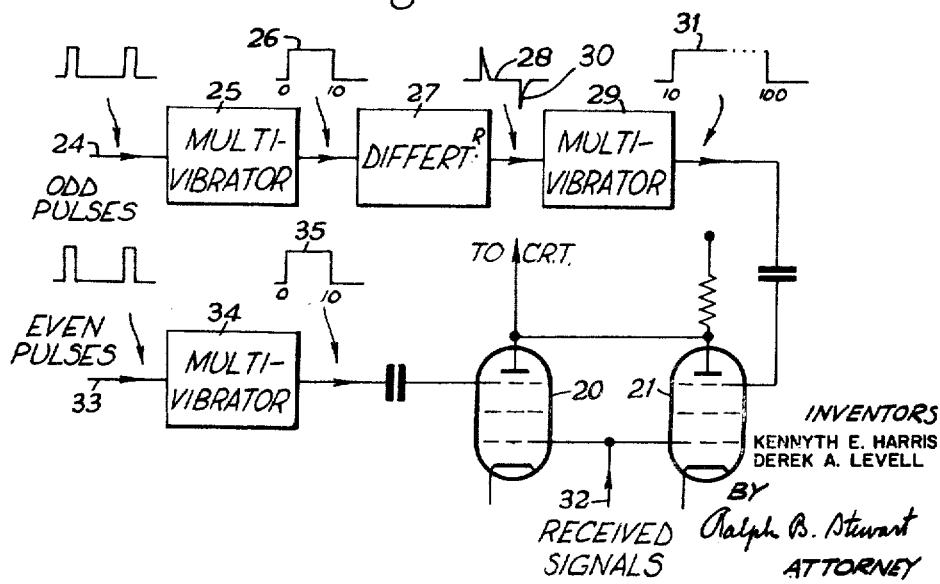
Fig. 2 shows more detail of the gating means in this embodiment.

The gating means 18 is shown in more detail in Fig. 2. Odd pulses are fed by a connection 24 to a multivibrator 25 which is triggered by their leading edges and is designed to remain actuated for a time corresponding to 10 miles. A pulse 26 from the multivibrator is differentiated at 27 producing a waveform 28 and a second multivibrator is arranged to be triggered by the negative-going part 30 of the waveform 28 and to remain actuated for a time corresponding to 90 miles, thus generating the waveform 31. This waveform 31 is applied to the suppressor grid of a gated amplifier valve 21, signals from the receiver 17 of Fig. 1 being applied by a connection 32 to the control grid of the valve. Thus the gating pulses 31 open the gate constituted by the valve 21 for a time corresponding to a range of 10 to 100 miles.

Even numbered pulses are fed by a connection 33 to a multivibrator 34 which is of the same construction as 25 and generates a gating waveform 35 which is applied to a gated amplifier valve 20 also having its control grid connected to the receiver at 32. Thus the gate 20 is opened for times corresponding to a range of 0 to 10 miles.

Assuming that the maximum intensity in any side lobe of the transmitter aerial 16 when the high power transmitter 13 is operating is 20 db below that in the main lobe, and assuming that the maximum range of response from a transponder is 100 miles, the maximum range from which a response can be obtained in a side lobe is 10 miles. No response will therefore be passed to the cathode ray tube from interrogating pulses in the side lobes when the higher intensity pulses are operative because the signals generated under the control of these pulses are gated in such a way that only those from ranges between 10 and 100 miles are passed.

On the other hand when the low power transmitter 14 is operative the only responses that can be produced in side lobes will be from below 1 mile and this may often be unimportant. If desired, however, the gating pulses 35 may be arranged to gate signals between 1 and 10 miles instead of between 0 and 10 miles as described in order to avoid side lobe response from below 1 mile. Alternatively, or in addition, a control pulse may be transmitted from an omni-directional aerial a few microseconds before each of the low power pulses in the manner described in the aforementioned patent specification.

Since such a control signal transmitter is used only with the interrogating pulse of low power, its power can also be relatively small.

When a control signal is used, the range of the lower gate may be increased, say to 0.5 to 10 miles, while maintaining suppression of side lobe response.

We claim:

1. A secondary radar system comprising a transmitter transmitting interrogating pulses for reception by a transponder, and a receiver for receiving signals radiated from said transponder in response to said interrogating pulses, said transmitter including interrogating pulse generating means generating two interlaced trains of interrogating pulses, the pulses of one said train being of different intensity from those of the other said train and occurring in fixed time relation to those of the other said train, and said receiver comprising gating pulse generating means, means controlling said gating pulse generating means to generate a gating pulse commencing at a time after each of the interrogating pulses of greater intensity corresponding to a minimum range and ending at a time corresponding to a maximum range, gating means, means coupling said receiver to said gating means, and means coupling said gating pulse generating means to said gating means to open said gating means to signals from said receiver during said gating pulses, whereby said gating means select from signals received from the transponder in response to interrogating pulses of the greater intensity only those from between said minimum and said maximum range.

2. A scecondary radar system comprising a transmitter transmitting interrogating pulses for reception by a transponder and a receiver for receiving signals radiated from said transponder in response to said interrogating pulses, said transmitter including interrogating pulse generating means generating two interlaced trains of interrogating pulses, the pulses of one said train being of different intensity from those of the other said train and occurring in fixed time relation to those of the other said train, and gating pulse generating means, means coupling said gating pulse generating means for control by said transmitter to initiate a gating pulse at a predetermined time after each interrogating pulse of the greater intensity and terminating before the next transmitted pulse of low intensity, gating means, means coupling said receiver to said gating means, and means coupling said gating pulse generating means to said gating means to open said gating means to signals from said receiver during said gating pulses, whereby said gating means select from signals received from the transponder in response to interrogating pulses of the greater intensity only those from ranges exceeding a predetermined minimum as fixed by the time of initiation of said gating pulse.

3. A secondary radar system comprising a transmitter transmitting interrogating pulses for reception by a transponder and a receiver for receiving signals radiated from said transponder in response to said interrogating pulses, said transmitter including interrogating pulse generating means generating two interlaced trains of interrogating pulses, the pulses of one said train being of different intensity from those of the other said train and occurring in fixed time relation to those of the other said train, and gating pulse generating means, means coupling said gating pulse generating means for control by said transmitter to initiate a first gating pulse at a predetermined time after each interrogating pulse of the greater intensity and to terminate said first pulse before the next transmitted pulse of low intensity, said gating pulse generating means operating to produce a second gating pulse of shorter duration than said first pulse and occurring immediately after each interrogating pulse of the lower intensity, gating means, means coupling said receiver to said gating means, and means coupling said gating pulse generating means to said gating means to open said gating means to signals from said receiver during said gating pulses whereby said gating means select from signals received from the transponder in response to interrogating pulses of the greater intensity only those from ranges exceeding a predetermined minimum and in response to interrogating pulses of lower intensity only those from short ranges.

4. A system according to claim 3, wherein the duration of the second gating pulse is substantially equal to the time delay interval in initiation of the first gating pulse following an interrogating pulse of greater intensity.

5. A system according to claim 1, wherein the two trains each consist of single pulses.

6. A system according to claim 5, wherein the pulses of the two trains together have a substantially constant recurrence frequency.

7. A secondary radar system comprising a transmitter transmitting interrogating pulses for reception by a transponder and a receiver for receiving signals radiated from said transponder in response to said interrogating pulses, said transmitter including interrogating pulse generating means generating two interlaced trains of interrogating pulses, the interval between successive interrogating pulses being greater than the maximum response time of said system, the pulses of one said train being of greater intensity from those of the other said train and occurring in fixed time relation to those of the other said train, and said receiver comprising gating pulse generating means, means coupling said gating pulse generating means for control by said transmitter to initiate first and second gating pulses, said first gating pulse being timed to select signal pulses received from longer ranges and being initiated after a time interval $t_3$ following an interrogating pulse of the greater intensity, said time interval $t_3$ corresponding to an intermediate range, and said second gating pulse being timed to select signal pulses received from shorter ranges and being initiated in response to an interrogating pulse of the lower intensity and terminating at a time $t_2$ after the pulse of the lower intensity, said time interval $t_2$ being not greater than $t_3$, a signal indicator, gating means coupling said receiver to said signal indicator and means coupling said gating pulse generating means to said gating means to open said gating means to signals from said receiver during said gating pulses, whereby said gating pulses select from signals received from the transponder in response to interrogating pulses of the greater intensity only those received from said longer ranges exceeding said intermediate ranges and in response to interrogating pulses of lower intensity, selects only those signals received from said shorter ranges.

8. A system according to claim 7 wherein the duration of the second gating pulse is substantially equal to the time delay interval in initiation of the first gating pulse following an interrogating pulse of greater intensity.

References Cited in the file of this patent

UNITED STATES PATENTS

| | | |
|---|---|---|
| 2,521,016 | Miller | Sept. 5, 1950 |
| 2,682,048 | Longacre | June 22, 1954 |

UNITED STATES PATENT OFFICE
CERTIFICATION OF CORRECTION

Patent No. 2,962,713                      November 29, 1960

Kennyth Ernest Harris et al.

It is hereby certified that error appears in the above numbered patent requiring correction and that the said Letters Patent should read as corrected below.

In the grant, lines 2 and 3, and 12, and in the heading to the printed specification, lines 4 and 5, name of assignee, for "A. C. Cosser Limited", each occurrence, read -- A. C. Cossor Limited --.

Signed and sealed this 20th day of June 1961.

(SEAL)
Attest:

ERNEST W. SWIDER
Attesting Officer

DAVID L. LADD
Commissioner of Patents